United States Patent Office 2,906,736
Patented Sept. 29, 1959

2,906,736
ACYLATED VINYLHYDROQUINONES AND POLYMERIC PRODUCTS THEREOF

Harold G. Cassidy, West Haven, Conn., assignor to Research Corporation, New York, N.Y., a corporation of New York No Drawing. Application December 20, 1954
Serial No. 476,566

13 Claims. (Cl. 260—47)

This invention relates to novel acylated vinylhydroquinones and to useful applications thereof, particularly to their use in the preparation of valuable polymerized products.

This application is a continuation-in-part of my copending application Serial Number 136,428, filed December 31, 1949, now U.S. Patent No. 2,700,029, and of my copending application Serial Number 388,657, filed October 27, 1953.

This invention has among its objects the provision of novel acylated vinylhydroquinones having useful applications in the arts, and the use of such compounds in facilitating the preparation of polymerized compositions including copolymers prepared from mixtures thereof with other ethylenic or vinyl monomers. Another object is the provision of novel polymerized compositions including chain units based on monomeric acylated vinylhydroquinone. These and other objects will be apparent from the illustrative details in the following description.

As described in detail in my copending applications, referred to above, and in the following publications: Cassidy et al., Journal of the American Chemical Society, volume 71, pages 402–410 (1949), volume 75, pages 1610–1617 (1953), and Proceedings of the National Academy of Sciences, volume 38, pages 934–937 (1952), Chemical and Engineering News, volume 29, page 4942 (1951), and Manecke, Zeitschrift für Elektrochemie, volume 57, pages 189–194 (1953), synthetic polymers have been prepared which have been shown to possess reversible oxidation-reduction properties, that is, they are capable of reversible electron exchange with the molecules or ions of a contiguous phase. Polymeric compounds of this character are hereinafter referred to as electron exchange polymers or redox polymers.

Polyvinylhydroquinone, for example, has been found to show such redox properties, particularly, high melocular weight polymers formed by first acylating vinyl hydroquinone, polymerizing and saponifying the acylated polymer. In this way, it has been possible to prepare electron exchange polymers based on this monomer having molecular weights in excess of 15,000 and up to about 40,000 or over. Such high molecular weight polymers could not be made readily using vinylhydroquinone itself, but were prepared readily by the polymerization of vinylhydroquinone after acetylation or benzoylation of its hydroxyl groups and removal of the protective groups by saponification following the polymerization reaction. Saponification was carried out, for example, by means of 0.2 N sodium ethylate solution in ethyl alcohol. On neutralization of the saponification mixture with dilute aqueous hydrochloric acid, followed by further dilution with water, the high molecular weight polyvinylhydroquinone separates as a white flocculent precipitate.

The preparation of redox polymers is not limited to processes of polymerizing monomers of a single type containing a suitable redox group, since it is feasible to prepare useful polymers by the copolymerization of monomer containing redox groups with other monomers free of redox groups. For example, vinylhydroquinone has been copolymerized with monomeric styrene. In such a product, hydroquinone residues are presumably distributed differently along the polymer chains than in polyvinylhydroquinone.

The production of such copolymers in accordance with methods well known in the art, such as by bulk or emulsion copolymerization processes, offers the possibility not only of securing products having reversible oxidation-reduction properties of a desired range, but also possessing the physical properties necessary for specific uses.

For example, the preparation of a copolymer formed from monomeric vinylpyridine and monomeric vinylhydroquinone leads to a product characterized by repeated spaced units as side-chains along the polymeric chain some of which consist of hydroquinone groups, as the redox unit, and others of which consist of the pyridine group. The resulting polymer offers an interesting combination of properties in view of the alkaline nature of the pyridine groups and the acidic nature of the hydroquinone groups, as well as the redox nature of the latter.

Vinylhydroquinone may likewise be copolymerized with more than one monomeric compound. For example, copolymers may be prepared containing both styrene and vinylpyridine groups in addition to those of vinylhydroquinone. Valuable products may be prepared by substituting for either or both styrene and vinylpyridine, in whole or in part, other monomeric substances such as butadiene, acrylonitrile, methyl or other alkyl methacrylate, alkyl fumarate, vinyl chloride, vinyl acetate, maleic anhydride, or isobutene, which substances may be classed as ethylenic monomers. In such copolymerizations it may at times be advantageous to protect the hydroxyl or other active groups of the redox monomer by such means as etherification or acetylation or other acylation.

Polyvinylhydroquinone copolymers may likewise include chain units which are heteropolar in the oxidized form, that is, in the form in which the polymer unit is capable of acting as an oxidizing agent. Such units occur in the alkyl polyvinylpyridinium halides, such as butyl polyvinyl pyridinium bromide, which was described by R. M. Fuoss and U. P. Strauss in Journal of Polymer Science, volume 3, page 246 (1948).

By suitable substitution the mid-point potential of the polymer, and hence its tendency to accept or donate electrons, can be adjusted. Thus it is well known that "electronegative" substituents affect the mid-point potential of a reducible or oxidizable substance (as hydroquinonyl or quinonyl) oppositely to "electropositive" substituents. A whole gamut of mid-point potentials may therefore be obtained by employing suitable nuclei in the monomers which are copolymerized, such as substituted hydroquinone, or condensed-ring hydroquinones, or indophenols, quinone imines or diimines, or by introducing substituents after polymerization. The mid-point potential can also be influenced by such factors as influence ionization of the exchange polymer, such as the hydrogen ion concentration of the ambient medium and its dielectric properties. These may be influenced, as pointed out above, by copolymerization with monomers which ultimately will bear acidic or basic groups. This latter arrangement permits the development of a self-buffering electron exchange polymer.

The preferred copolymers of this invention are of the vinyl type. They include chain units of vinylhydroquinone and of at least one other vinyl monomer combined by addition polymerization to a high molecular weight product. It is to be understood that some or substantially all of the vinylhydroquinone units may exist in the oxidized form and that the actual copolymerization may be effected with acylated or etherified vinylhydroquinone, such protective groups being removed following the polymerization reaction. Vinyl monomers include particularly compounds of the general formula

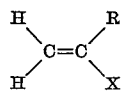

where R represents a hydrogen atom or a monovalent hydrocarbon group such as an alkyl group and X represents a polar or polarizable group such as a halogen atom, an acyl group such as acetyl or propionyl, a phenyl group, or a substituted phenyl group.

Especially valuable products result when a divinyl monomer such as divinyl benzene is copolymerized with vinylhydroquinone and, if desired, other vinyl monomers. Such products are characterized particularly by reduced solubility in the usual solvents. Divinyl benzene may be used in the generally available commercial form, comprising a mixture of the three isomers together with some ethyl vinyl benzene and diethyl benzene. Other divinyl monomers useful in this regard are of the symmetrical type such as divinyl biphenyl, divinyl ether, diallyl phthalate, or ethylene glycol dimethylacrylate or of the unsymmetrical type such as vinyl acrylate, allyl methacrylate or vinyl chlorovinyl ether. Generally up to several percent by weight and not more than about 10% of such divinyl monomer is advantageous.

Illustrative details of the synthesis of polymeric products of this invention are given in the following specific examples.

*Example 1*

Benzoylated vinylhydroquinone, or 2,5-dibenzoxystyrene, was prepared by treating vinyl hydroquinone with slightly more than the calculated amount of benzoyl chloride in pyridine solution. After the reaction mixture was thoroughly agitated and allowed to stand for a few hours, it was treated with hydrochloric acid solution, resulting in the separation of an oil which crystallized after a few minutes. The product was washed with water, dried and recrystallized from 95% ethyl alcohol, at a yield of 78% based on the vinylhydroquinone. This new compound was isolated in the form of colorless crystals, found to contain 76.3% carbon and 5.1% hydrogen, values close to the theoretical 76.8% carbon and 4.7% hydrogen for dibenzoxystyrene. The purified material had a melting point of 96° C., and was soluble in benzene, toluene and ethyl acetate, while quite insoluble in water. The saponification value was found to be 176 and 168 for two different preparations, the calculated value being 172. The substance readily absorbed close to the theoretical volume of hydrogen for dibenzoxystyrene.

*Example 2*

Acetylated vinylhydroquinone, or 2,5-diacetoxystyrene, was prepared by treating vinylhydroquinone in pyridine solution with slightly over the calculated amount of acetyl chloride. After treatment of the reaction mixture with hydrochloric acid solution, followed with extraction with ether, the ether solution was dried over anhydrous sodium sulfate. The ether was removed by distillation and the residue of light yellow oil was distilled under reduced pressure. The acetylated vinylhydroquinone fraction was collected over a distillation range of 183 to 188° C. at a pressure of 17 mm. of mercury, at a yield of 53.5% based on the vinylhydroquinone.

In an alternative procedure, vinylhydroquinone, 3.0 grams, was treated with 4.8 ml. of acetic anhydride. A very small drop of concentrated sulfuric acid was added and the mixture stirred. After 3 to 4 minutes, water containing a trace of sodium chloride was added and the mixture stirred thoroughly. The oily product was washed six times with water, then the last product layer was removed from the tube with three 10 ml. portions of ether. Nitrogen was bubbled through the ether solution at 0° C. for 15 to 20 minutes. The ether solution was quickly extracted with a cooled solution containing 1% sodium hydroxide and a trace of sodium hydrosulfite through which nitrogen had been bubbled. The ether solution was then washed with water four times, dried, the solvent removed and the product crystallized twice from 95% ethyl alcohol. Colorless crystals having a melting point of 48–49° C. were obtained, found to contain 65.7% carbon and 5.8% hydrogen.

*Example 3*

2,5-dibenzoxystyrene, with somewhat less than 1% added benzoyl peroxide, was sealed in a glass tube under vacuum and polymerized under steam conditions (100° C.) for 96 hours. The crude polymer was a pale amber, brittle glassy material. After extraction with hot ethyl acetate to remove any residual monomer and low molecular weight products, it was dissolved in benzene. The solution was then frozen in a bath containing acetone and solid carbon dioxide and the solvent was removed under reduced pressure, leaving a white amorphous fluffy powder. The polymer swells and becomes rubbery in ethyl acetate; is soluble in benzene and toluene, but insoluble in alcohol and in water. Ebullioscopic determinations indicated the molecular weight as greater than 15,000. The saponification equivalent was measured as 168, compared to the theoretical value of 172, and the percentages of carbon and hydrogen were determined to be 76.4 and 5.1%, respectively, close to the calculated values of 76.8% and 4.7% for polydibenzoxystyrene.

In an alternative procedure, a 20% solution in toluene (0.4 g. monomer) containing 4 mg. of benzoyl peroxide was heated 48 hours at 85° C. This was diluted with toluene and precipitated by addition to ligroin. The purified, freeze-dried polymer was a white, fluffy material, soluble in aromatic solvents, insoluble in alcohol, acetic acid and water; molecular weight 52,000 (160 monomer units).

*Analysis.*—Calculated for $(C_{22}H_{16}O_4)_n$: C, 76.7%; H, 4.7%; saponification equivalent 172. Found: C, 75.4%; H, 4.7%; saponification equivalent, 180.

When the polymer was saponified, reduced and purified, and freeze-dried from 90% acetic acid the free polymer was obtained as a fluffy white material which slowly turned light pink on exposure to air. It is insoluble in benzene, slightly soluble in water, soluble in a mixture of 90 parts acetic acid with 10 parts water (90% acetic acid), 95% ethanol, and tertiary butyl alcohol containing a little water.

*Analysis.*—Calculated for $(C_8H_8O_2)_n$: C, 70.6%; H, 5.9%. Found: C, 64.9%; H, 6.5%; ash, 1.9%.

The ash is presumably from the glass saponification vessel.

*Example 4*

Monomeric vinylhydroquinone diacetate (0.2 gram) as a 10% solution in benzene, with 0.3 mg. of benzoyl peroxide was heated 63 hours at 67° C. Polymer separated on cooling. It was dissolved in acetone and added to excess ligroin for purification by precipitation. It was obtained as a white, fluffy material after freeze-drying from glacial acetic acid. It was insoluble in cold aromatic solvents, and soluble in acetic acid and acetone.

*Analysis.*—Calculated for $(C_{12}H_{12}O_4)_n$: C, 65.4%; H, 5.5%; saponification equivalent, 110. Found: C, 64.5%; H, 5.7%; saponification equivalent, 107.

After saponification, reduction, purification, and freeze-drying from 90% acetic acid, it appeared as a white, fluffy material, soluble in 90% acetic acid, and in tertiary butyl alcohol containing a little water. It is slightly soluble in water, and insoluble in benzene.

The procedures set forth in Examples 3 and 4 may essentially be followed for the preparation of copolymers with the addition, in the desired proportion, of a divinyl monomer and/or other vinyl monomer.

The saponification after polymerization when monomeric acylated vinylhydroquinone is used must generally be carried out in the absence of oxygen, and is conveniently done in a sealed tube when the saponification equivalent is required, or, for larger quantities, in a special apparatus. This latter is essentially an H-shaped vessel with bulbs at the bases, and stopcock-equipped stoppers at the tops of each leg; with a stopcock and condenser on the cross-tube, and with a condenser on one leg. The polymer is introduced into the leg with the condenser; sodium ethylate, approximately 0.2 N into the other. The bulbs are cooled in freezing mixture and the apparatus evacuated and filled with nitrogen several times, being finally evacuated and closed. By tipping the vessel, the alkali is transferred through the cross-tube on to the polymer. There is usually developed a transient blue color. If air is present in any amount, or if the apparatus leaks, the blue color remains or intensifies. By means of the stopcocks at the top of this leg and on the cross-tube, the mixture is isolated. It is now refluxed on the steam-bath. Twenty-four hours of reflux has been used. After reflux, the apparatus is cooled. Excess acid, e.g., 1 N sulfuric acid, is introduced into the empty leg of the apparatus, evacuated and flushed with nitrogen several times, then the stopcock on the cross-tube is opened under vacuum and the acid is transferred to the saponification mixture. Following this step it is permissible to work in the air, though even under acid conditions the free polymer tends to become pink on exposure to the atmosphere.

The saponified polymer is precipitated by adding the acidified saponification mixture (in which the polymer remains soluble due to the alcohol present) to a large excess of water, centrifuging and washing the precipitate twice by centrifugation. The polymer is purified further by dissolving it in a suitable solvent, usually 90% acetic acid, and precipitating it by addition to an excess of water. This is repeated at least once. During these manipulations the polymers tend to become slightly pink (slightly oxidized). To prepare the essentially completely reduced form the polymer is suspended in a little air-free water, a freshly prepared 5% solution of sodium hydrosulfite ($Na_2S_2O_4$) containing a trace of alkali is added and stirred with it under purified nitrogen for a short time. The reduced polymer is quickly removed by centrifugation (or filtration) and washed several times with water. It may be dissolved and reprecipitated for further purification. Finally it is dissolved in 90% acetic acid or tertiary butyl alcohol containing a little water, and freeze-dried.

Example 5

Vinylhydroquinone dibenzoate (0.40 g.) and styrene (0.126 g.), in about a 1:1 molar ratio, as a 20% solution in toluene, with 5.2 mg. of benzoyl peroxide was heated 72 hours at 85° C. On dilution with toluene, precipitation by addition to ligroin, purification and freeze-drying from benzene the polymer was obtained as white fluffy material, soluble in aromatic solvents, insoluble in alcohol, acetic acid and water; molecular weight 41,300 (about 200 units on a 1:1 basis).

*Analysis.*—Calculated for $(C_{30}H_{24}O_4)_n$: C, 80.3%; H, 5.4%; saponification equivalent, 1:1 basis, 224. Found: C, 79.0%; H, 5.4%; saponification equivalent, 242.

That the substance is a copolymer is indicated by the observation that the substance is completely soluble in concentrated sulfuric acid. A mixture of polystyrene and polyvinylhydroquinone dibenzoate treated under the same conditions with concentrated sulfuric acid leaves the polystyrene undissolved.

After saponification, reduction, purification and freeze-drying from 90% acetic acid a fluffy light tan material is obtained, soluble in 90% acetic acid, insoluble in benzene.

*Analysis.*—Calculated for $(C_{16}H_{16}O_2)_n$ (1:1 ratio): C, 78.0%; H, 6.7%; ash (probably introduced from the glass during saponification), 1.72%.

Example 6

Vinylhydroquinone dibenzoate (0.40 g.) and 4-vinylpyridine (0.122 g.), in about a 1:1 molar ratio, in 20% solution in toluene, with 5.2 mg. of benzoyl peroxide was heated 36 hours at 85°. The viscous and slightly turbid product was diluted with toluene and added to excess ligroin for precipitation. The product was fractionated as follows: fraction 1 (14 mg.), soluble in toluene at room temperature; fraction 2 (87 mg.), soluble in toluene at 100° C.; fraction 3 (196 mg.), insoluble in toluene at 100° C. (soluble in methyl ethyl ketone at room temperature). Fraction 3 was much more highly charged statically than the other two, retaining its charge even after several months of storage in glass. All three fractions were soluble in benzene, from which they were separately freeze-dried as white, fluffy materials. None of them showed any solubility in ethanol, indicating the absence of polyvinylpyridine, and thus the copolymer nature of the substances.

*Analysis.*—Calculated for $(C_{29}H_{23}O_4)_n$ (1:1 ratio): C, 77.5%; H, 5.2%; N, 3.1%; saponification equivalent on a 1:1 basis, 224.5. Found: C, fraction 1, 64.6%; fraction 2, 76.3%; fraction 3, 75.9%. H, fraction 1, 5.3%; fraction 2, 5.2%; fraction 3, 5.2%. N, fraction 3, 3.1%. Saponification equivalent, fraction 2, 218; fraction 3, 218.

After saponification the solutions of fractions 2 and 3 were made strongly acid with standard hydrochloride acid and back titrated with standard sodium hydroxide. The copolymers precipitated when a pH of about 4.4 was reached, and they did not redissolve when again strongly acidified. Reduction with hydrosulfite converted the brick-red polymer to a light yellow material, insoluble in 90% acetic acid or tertiary butyl alcohol containing a little water. The fractions were freeze-dried as suspensions in acetic acid.

When saponification of a sample of fraction 3 was carried out in the strict absence of air and the products neutralized with standard acetate buffer the product was white, insoluble in water, or tertiary butyl alcohol alone or diluted with a little water. It was readily soluble in wet acetic acid, from which it did not precipitate on addition to much water. This seemed to indicate the solubilizing effect of the pyridine acetate part of the polymer. It was partially dissolved by 6 N hydrochloric acid, and dissolved completely when the acid was removed and water added to the solid. The saponified polymer became light pink in a matter of a few hours after preparation, and continued to darken. It was freeze-dried as a suspension in water, and was then a pinkish red, and no longer soluble in wet acetic acid.

Example 7

Vinylhydroquinone dibenzoate (1.0 g.) and alpha methylstyrene (0.34 g.), in about a 1:1 molar ratio, as a 50% solution in toluene, containing 1.4 mg. of benzoyl peroxide (about 0.1 mol percent), was heated 6 hours at 70° C. On dilution with toluene, addition to methanol for precipitation, purification and freeze-drying from benzene, the copolymer was obtained as a white fluffy material. It was soluble in aromatic solvents; insoluble in alcohol, acetic acid, and water.

*Analysis.*—Calculated for $(C_{31}H_{26}O_4)_n$ (1:1 ratio): C, 80.5%; H, 5.6%; saponification equivalent, 231. Found: C, 78.5%; H, 5.2%; saponification equivalent, 202.

After saponification, and reduction, purification and freeze-drying from 90% acetic acid the copolymer was obtained as a fluffy white material which slowly became tan in tint. It was soluble in 90% acetic acid and insoluble in aromatic solvents and in water.

*Analysis.*—Calculated for $(C_{17}H_{18}O_2)_n$ (1:1 ratio): C, 80.3%; H, 7.1%. Found: C, 71.3%; H, 7.2%.

Example 8

Vinylhydroquinone dibenzoate (0.40 g.) and styrene (0.122 g.) were mixed with "divinyl benzene" (0.024 g. of the commercial product containing about 50% of the isomers) and 5.5 mg. of benzoyl peroxide (1% by weight). The mixture was warmed and added to 5 ml. of 1% polyvinyl alcohol solution rapidly stirred under nitrogen at 82° C. The droplets first formed soon coalesced to some extent so that the polymerization mixture contained beads of quite different sizes. After 5 hours the product was separated, crushed to small white granules, washed and dried over $P_2O_5$.

*Analysis.*—Calculated for $(C_{30}H_{24}O_4)_n$ (1:1 ratio neglecting the divinyl benzene): C, 80.3%; H, 5.4%. Found: C, 77.8%; H, 5.0%.

The polymer was saponified, subjected to reduction with hydrosulfite and isolated as a light tan material insoluble in all solvents tried, even when hot.

Example 9

Vinylhydroquinone dibenzoate, 5.00 g., freshly distilled alpha methylstyrene, 1.737 g., commercial divinyl benzene mixture, 0.7122 g., and benzoyl peroxide 0.111 g., giving a molor ratio of the first two monomers of 1:1, and a weight ratio of 10.5% divinyl benzene solution and 1.5% benzoyl peroxide, were mixed, warmed slightly to obtain complete solution, and added to a stirred mixture of 62 ml. distilled water and 1.85 g. soluble starch. (The weight ratio of the aqueous mixture was water, 8.2 times the weight of the monomers and benzoyl peroxide mixture, and starch, 3% of the weight of the water.) The starch-water mixture had been heated to about 80° C. The organic mixture formed small droplets, the size of which could initially be controlled by the rate of stirring, though after a few hours the set size was fixed by the ensuing internal cross-linking. Hard beads were present in 2¾ hours. Stirring was stopped after several more hours, and the heating continued overnight. The temperature can be raised at this point. Excellent beads were obtained, which were thoroughly washed with water, first with cold water to remove starch. Dry weight, 6.841 g. The beads were thoroughly extracted with toluene, which swelled them, to remove unchanged monomers and low molecular weight material. The resulting beads, the sizes of which varied somewhat, were colorless and transparent. Their insolubility in boiling toluene indicated firm cross-linking.

Example 10

Vinylhydroquinone dibenzoate, 1.00 g., and 3.439 g. of freshly distilled alpha methylstyrene (mol ratio of monomers 1:10), were mixed with 0.446 g. divinyl benzene and 0.0736 g. benzoyl peroxide (respectively 10% and 1.5% by weight of the first two monomers). A portion of this (3.73 g.) was warmed gently to ensure complete solution and to pre-warm the mixture, and poured into a heated, stirred mixture of 25 ml. distilled water containing 0.75 g. starch. The polymerization and subsequent curing by continued heat was carried out substantially as in Example 9, and purification of the product was similarly carried out by washing first with cold water to remove starch, then with hot water, drying to remove the water, and thorough extraction with the swelling liquid benzene to remove unchanged monomer and low molecular weight material. (Toluene or other organic solvent may also be used to remove these impurities.) The product was granular, translucent, and insoluble. Another portion of the mixture of monomers and catalyst was used to impregnate several pieces of Reeve Angel #201 filter paper 4.25 cm. in diameter. These were cured by hanging them in a glass vessel in an oven at 80°. The resulting impregnated papers were pale yellow in color.

Example 11

Vinylhydroquinone dibenzoate, 5.00 g., freshly distilled alpha methylstyrene, 1.72 g., and ethyl fumarate, 2.51 g. (mol ratio of monomers 1:1:1), were mixed and 11.1% divinyl benzene mixture (1.02 g.) and 1.5% benzoyl peroxide (0.152 g.) were added. The mixture was warmed and introduced as in Examples 9 and 10 into a heated, stirred mixture of 85 ml. distilled water and 2.55 g. soluble starch. The polymerization and working up of the product were carried out substantially as in Example 10. The resulting beads, as in the previous were readily swelled by benzene. The clear, transparent, insoluble beads weighed 9 g.

Example 12

Vinylhydroquinone dibenzoate, 2.00 g., freshly distilled alpha methylstyrene, 0.688 g., water-white vinyl pyridine, freshly distilled at 18 mm. mercury pressure, under nitrogen, 0.615 g. (mol ratio of monomers 1:1:1), were mixed and 11.75% divinylbenzene mixture (0.356 g.) and 1.5% benzoyl peroxide (0.0545 g.) were added. The mixture was warmed, as in Example 9, and introduced into the hot mixture of 39.5 ml. water with 1.2 g. soluble starch, with stirring. Some foam was produced. The mixture was polymerized and the product worked up substantially as in Examples 9 and 10. Glistening, translucent insoluble yellow beads were obtained. They were swelled by benzene.

*Analysis.*—Found: C, 78.8%; H, 5.6%; N, 1.2%.

Example 13

Vinylhydroquinone dibenzoate, 2.00 g., freshly distilled alpha methylstyrene, 0.693 g., freshly purified vinyl pyridine, 0.638 g., and ethyl fumarate, 1.02 g. (ratio of monomers 1:1:1:1), were mixed, and 10.6% divinyl benzene mixture (0.462 g.) and 1.5% benzoyl peroxide (0.171 g.) were added. The mixture was treated substantially as in Example 10, using 30 ml. water and 0.9 g. soluble starch. Glistening yellow beads were obtained. They were translucent, and insoluble. They were swelled by benzene.

*Analysis.*—Found: C, 75.7%; H, 6.4%; N, 1.4%.

Example 14

Vinylhydroquinone dibenzoate, 1.00 g., styrene, freshly distilled under nitrogen at 18 mm. mercury pressure, 3.03 g., freshly purified vinyl pyridine, 0.308 g., ethyl fumarate, 0.516 g. (mol ratio of the monomers 1:10:1:1), were mixed and 10.3% divinyl benzene mixture (0.5 g.) and 1.5% benzoyl peroxide (0.08 g.) were added. The mixture was treated substantially as in Examples 9 and 10, using 44 ml. water and 2.2 g. soluble starch. Very small beads were obtained which were thoroughly washed with water. The product was granular, colorless, and insoluble.

Example 15

Vinylhydroquinone dibenzoate, 1.00 g., freshly purified styrene, 6.06 g., freshly purified vinyl pyridine, 0.314 g., ethyl fumarate 0.54 g. (mol ratio of monomers 1:20:1:1), were mixed and 10% divinylbenzene mixture (0.8 g.) and 1.5% benzoyl peroxide (0.13 g.) were added. The mixture was polymerized substantially as in Examples 9 and 10, using 75 ml. water and 3.6 g. soluble starch. Very small beads were obtained, and thoroughly washed with water. The product was granular, colorless and insoluble.

Like procedures may be used to prepare copolymers with one or more of the above-described vinyl monomers containing from 1% to 99% of vinylhydroquinone units, in order to provide the desired properties, particularly with respect to electron exchangeability.

The adjustment of the tendency to accept or donate electrons by controlling the copolymer composition is illustrated by the comparative observed mid-point potentials in 90% acetic acid solution (pH, 0.35), the value for polyvinylhydroquinone being 0.400 volt and that for the 1:1 copolymer with alpha methylstyrene being —0.004 volt. Another indication of this nature was observed with respect to the deep blue color developed by polymers containing vinylhydroquinone groups in the presence of air and alkali. The pH at which this color begins to appear seems to vary with the different polymers, for example, being about 10.5 to 10.6 for polyvinylhydroquinone, 11.8 to 12.0 for the copolymer with styrene, and 11.55 to 11.75 for that with vinylpyridine.

It is further to be understood that polymers and copolymers of acylated vinylhydroquinone can advantageously be subjected to partial saponification resulting in a polymeric product in which the vinylhydroquinone hydroxyls are partly free and partly esterified. In this way desired solubility characteristics can be obtained and advantageous anti-oxidant properties of the free hydroxyl groups realized.

In addition to uses based on the redox character of the above de-acylated polymeric compositions, as described in my copending applications previously referred to, the unsaponified polymers and copolymers are advantageous for many purposes. Such polymeric products, comprising acylated vinylhydroquinone units, can be utilized with advantage for the fabrication of molded products, membranes, sheets and foil having desirable properties. The acylated vinylhydroquinone chain units contribute an internal stabilizing effect in the polymeric chain in view of the formation of free hydroxyl groups, with anti-oxidant effects, in the hydroquinone side chain under hydrolytic conditions. The ester linkages confer oil solubility and provide sites for hydrogen bonding leading to improved plasticization.

Monomeric acylated vinylhydroquinones in accordance with this invention have the structure

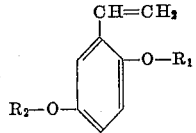

where $R_1$ is hydrogen or acyl, such as acetyl, propionyl, or benzoyl and $R_2$ is an acyl such as acetyl, propionyl or benzoyl. The acyl groups of $R_1$ and $R_2$ preferably contain 2 to 18 carbon atoms. They may be formed by the reaction of one or two moles of acyl chloride or anhydride per mole of vinylhydroquinone.

In addition to the utility of the acylated vinylhydroquinones in facilitating the preparation of high molecular weight polymeric compositions, the monomeric compounds find application as antiseptics and preservatives. They may also be used as anti-oxidants, particularly under hydrolytic conditions. These compounds are also conveniently applicable in chemical syntheses for the introduction of hydroquinone or substituted hydroquinone groups into more complex molecules, as by condensation or addition reactions.

I claim:

1. An acylated vinylhydroquinone of the general formula

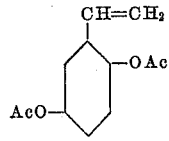

wherein Ac is an acyl group of an acid selected from alkanoic and monocyclic aryl monocarboxylic acids containing from 2 to 18 carbon atoms.

2. Vinylhydroquinone diacetate.
3. Vinylhydroquinone dibenzoate.

4. A polymerized acylated vinylhydroquinone of the general formula

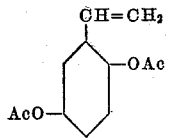

wherein Ac is an acyl group of an acid selected from alkanoic and monocyclic aryl monocarboxylic acids containing from 2 to 18 carbon atoms.

5. Polymerized vinylhydroquinone diacetate.
6. Polymerized vinylhydroquinone dibenzoate.
7. A process comprising heating in presence of a polymerizing catalyst an acylated vinylhydroquinone of the general formula

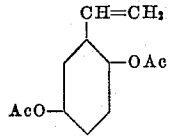

wherein Ac is an acyl group of an acid selected from alkanoic and monocyclic aryl monocarboxylic acids containing from 2 to 18 carbon atoms.

8. A process comprising heating in presence of a polymerizing catalyst vinylhydroquinone diacetate.
9. A process comprising heating in presence of a polymerizing catalyst vinylhydroquinone dibenzoate.
10. A process comprising heating in presence of a polymerizing catalyst an acylated vinylhydroquinone of the general formula

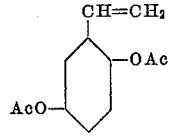

wherein Ac is an acyl group of an acid selected from alkanoic and monocyclic aryl monocarboxylic acids containing from 2 to 18 carbon atoms and saponifying the resultant polymer to form a deacylated polymer.

11. A process comprising heating in presence of a polymerizing catalyst a composition comprising an acylated vinylhydroquinone of the general formula

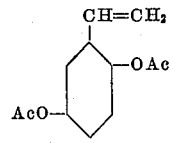

wherein Ac is an acyl group of an acid selected from alkanoic and monocyclic aryl monocarboxylic acids containing from 2 to 18 carbon atoms and at least one other vinyl monomer.

12. A process comprising heating in presence of a polymerizing catalyst a composition comprising an acylated vinylhydroquinone of the general formula

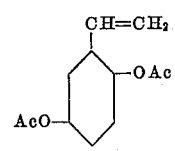

wherein Ac is an acyl group of an acid selected from alkanoic and monocyclic aryl monocarboxylic acids containing from 2 to 18 carbon atoms and at least one other vinyl monomer and saponifying the resultant copolymer to form a deacylated polymer.

13. The saponification product of a copolymer of an acylated vinylhydroquinone of the general formula

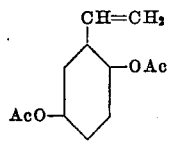

wherein Ac is an acyl group of an acid selected from alkanoic acids and monocyclic aryl monocarboxylic acids containing from 2 to 18 carbon atoms and at least one other vinyl monomer.

References Cited in the file of this patent

UNITED STATES PATENTS

| | | |
|---|---|---|
| 2,006,517 | Seymour | July 2, 1935 |
| 2,276,138 | Alderman et al. | Mar. 10, 1942 |
| 2,296,363 | Messer | Sept. 22, 1942 |
| 2,527,300 | Dudley | Oct. 24, 1950 |
| 2,694,693 | Minsk | Nov. 16, 1954 |
| 2,735,837 | Minsk et al. | Feb. 21, 1956 |

OTHER REFERENCES

Beilstein's Hand. der Org. Chem., 4th ed., Zweits. Erganz 1944, page 913. (Copy in Scientific Library.)